United States Patent
Grodecki

(10) Patent No.: US 7,445,214 B2
(45) Date of Patent: Nov. 4, 2008

(54) ROTATABLE HEAD FOR A DRIVE MOTOR

(75) Inventor: Lawrence Henry Grodecki, Winnipeg (CA)

(73) Assignee: M.A.A.C. Group Inc., Winnipeg, Manitoba (CA)

( * ) Notice: Subject to any disclaimer, the term of this patent is extended or adjusted under 35 U.S.C. 154(b) by 386 days.

(21) Appl. No.: 11/399,614

(22) Filed: Apr. 7, 2006

(65) Prior Publication Data
US 2007/0240244 A1    Oct. 11, 2007

(51) Int. Cl.
*B23Q 16/06*    (2006.01)
*B23Q 16/02*    (2006.01)

(52) U.S. Cl. .................. 279/5; 279/137; 408/238

(58) Field of Classification Search ........... 279/5, 279/137, 142; 408/239 A, 239 R, 238, 146, 408/186; 173/217; 483/50
See application file for complete search history.

(56) References Cited

U.S. PATENT DOCUMENTS

| | | | |
|---|---|---|---|
| 2,873,822 A * | 2/1959 | Sloan | 188/68 |
| 4,378,185 A * | 3/1983 | Dietrich | 408/140 |
| 4,548,417 A * | 10/1985 | Glommen | 279/5 |
| 5,136,896 A * | 8/1992 | Burka | 74/813 L |
| 5,878,638 A * | 3/1999 | Wang | 82/142 |
| 6,328,508 B1 * | 12/2001 | Jines | 409/221 |
| 6,715,969 B2 * | 4/2004 | Eriksen | 408/35 |
| 6,964,213 B2 * | 11/2005 | Newman et al. | 74/530 |
| 7,063,201 B2 * | 6/2006 | Nakamura et al. | 192/223.1 |

* cited by examiner

*Primary Examiner*—Burton Mullins
(74) *Attorney, Agent, or Firm*—Adrian D. Battison; Ade & Company Inc.

(57) ABSTRACT

A drive motor for driving a tool such as a grinding tool through a right angle drive has a rotatable head mounted on the housing and having a detent on the rotatable head for engaging a fixed component of the angled drive coupling so as to hold the axis of the angled drive coupling at a required angle around the axis of the housing and for adjusting the angle without removal of the right angle drive from the motor. The rotatable head includes an annular disk which surrounds the axis of the motor and has a central hole through which the driven member extends into the chuck. The disk is driven by an adjustment motor having a sprocket which engages gear teeth on the exterior of the disk and has a series of holes through the disk member at angularly spaced locations around the axis so that a locking pin driven by a locking pin motor engages into a selected one of the holes to lock the head at the required angle when rotated to the required angle by the adjustment motor.

21 Claims, 3 Drawing Sheets

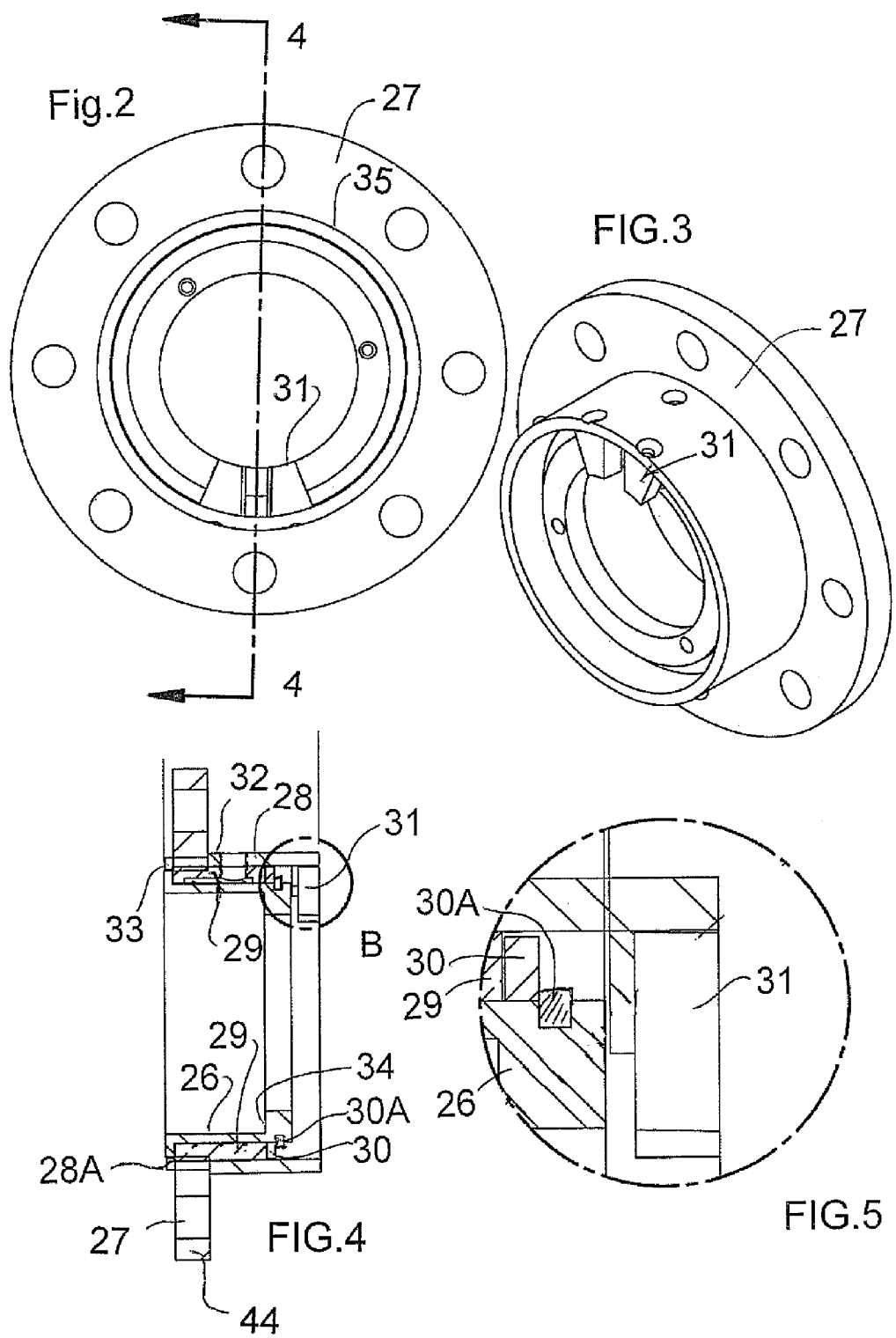

ROTATABLE HEAD FOR A DRIVE MOTOR

This invention relates to a rotatable head for a drive motor which can be used to adjust the angle of a stationary portion of a driven element to change its angle around the axis of the motor.

BACKGROUND OF THE INVENTION

Many devices use a motor which is driven to drive a suitable driven element such as grinding elements of a machine tool. Many such driven elements are simply rotatable about the axis of the motor but in some cases the position of the driven element is adjustable about the axis of the motor so as to change the position of the driven element as it is rotated about its axis.

For example this applies to a situation where an angle drive or gear box is mounted in the motor and provides an output drive which is at an angle to the axis of the motor. In many cases it is desirable to change the orientation of the angle of the output around the axis of the motor.

This requirement is common in regard to robotically controlled grinding or routing or drilling machines where the angle of the axis is required to be changed in order to change the grinding direction.

One example of a machine of this type is disclosed in Canadian Patent Application 2,482,201 (Robin) published Mar. 23, 2005 the disclosure of which is incorporated herein by reference and to which reference may be made for more detail of a suitable mode of use.

In many cases it is necessary to remove the angle drive or gear box from the chuck of the motor and to rotate the motor about its axis so as to pickup the angle drive at a different angle relative to the motor. This is often carried out by depositing the angle drive in a support, moving the motor to a new orientation and again picking up the angle drive from its support when a motor has changed direction.

This action of course requires a significant period of time and additional steps in the processing thus increasing the time necessary for certain processing steps in the robotic process.

It is of course well known that it is highly desirable for economics to reduce the process time on a robot system so as to increase productivity.

SUMMARY OF THE INVENTION

It is one object of the invention to provide a drive motor in which the angle of a driven element can be adjusted while it remains in position on the motor.

According to one aspect of the invention there is provided a drive motor for driving a driven element, the motor comprising:

a motor housing having a mounting connection for attachment of the housing to a support;

a rotor within the housing mounted for driven rotation about a longitudinal axis of the housing;

a chuck on the rotor for attachment of the rotor to the driven element for driving rotation of the driven element around the axis;

a rotatable head mounted on the housing and having a detent on the rotatable head for engaging a component of the driven element so as to hold the component of the driven element at a required angle around the axis of the housing and for adjusting the angle;

and an adjustment motor mounted on the housing for driving adjustment rotation of the rotatable head around the axis so as to effect adjustment of the required angle without removal of the driven element from the chuck.

Preferably the rotatable head includes a series of angularly spaced receptacles and wherein there is provided a locking pin operable to engage into a selected one of the receptacles to lock the head at the required angle when rotated to the required angle by the adjustment motor.

Preferably the locking pin is retractable by a pin retraction motor.

Preferably the rotatable head includes an annular disk member which surrounds the axis of the motor and through which the driven member extends into the chuck.

Preferably the rotatable head includes an annular disk member which surrounds the axis of the motor and has a central hole through which the driven member extends into the chuck and wherein the receptacles are defined by a series of holes through the disk member at angularly spaced locations around the axis.

Preferably the adjustment motor includes a sprocket arranged to drive the disk member.

Preferably the disk member defines a series of gear teeth around its periphery for driving by engagement with the sprocket.

Preferably the rotatable head includes a collar with the disk clamped onto an outside surface of the collar Preferably the driven member includes an axially extending abutment finger and the rotatable head includes a pair of elements mounted thereon and defining a slot for receiving the finger.

Preferably the rotatable head includes a sleeve which clamps the disk on to the collar and wherein the driven member includes an axially extending abutment finger and the sleeve includes a pair of elements mounted on an inside surface thereof at a position axially spaced from the disk and defining a slot for receiving the finger.

According to a second more detailed aspect of the invention there is provide a drive motor for driving a tool, the motor comprising:

a motor housing having a mounting connection for attachment of the housing to a support;

a rotor within the housing mounted for driven rotation about a longitudinal motor axis of the housing;

a chuck on the rotor;

an angled drive coupling having an input drive connection for mounting in the chuck and an output drive connection arranged at an angle to the axis for driving the tool about a tool drive axis inclined to one side of the motor axis;

a rotatable head mounted on the housing and having a detent on the rotatable head for engaging a fixed component of the angled drive coupling so as to hold the axis of the angled drive coupling at a required angle around the axis of the housing and for adjusting the angle;

and an adjustment motor mounted on the housing for driving adjustment rotation of the rotatable head around the axis so as to effect adjustment of the required angle without removal of the angled drive coupling from the chuck.

According to a third more detailed aspect of the invention there is provide a drive motor for driving a tool, the motor comprising:

a motor housing having a mounting connection for attachment of the housing to a support;

a rotor within the housing mounted for driven rotation about a longitudinal motor axis of the housing;

a chuck on the rotor;

an angled drive coupling having an input drive connection for mounting in the chuck and an output drive connection arranged at an angle to the axis for driving the tool about a tool drive axis inclined to one side of the motor axis;

a rotatable head mounted on the housing and having a detent on the rotatable head for engaging a fixed component of the angled drive coupling so as to hold the axis of the angled drive coupling at a required angle around the axis of the housing and for adjusting the angle;

wherein the rotatable head includes an annular disk member which surrounds the axis of the motor and has a central hole through which the driven member extends into the chuck;

the disk member having a series of holes through the disk member at angularly spaced locations around the axis;

a locking pin driven by a locking pin motor operable to engage into a selected one of the holes to lock the head at the required angle when rotated to the required angle by the adjustment motor;

and an adjustment motor mounted on the housing and including a sprocket arranged to drive the disk member for driving adjustment rotation of the rotatable head around the axis so as to effect adjustment of the required angle without removal of the angled drive coupling from the chuck.

BRIEF DESCRIPTION OF THE DRAWINGS

One embodiment of the invention will now be described in conjunction with the accompanying drawings in which:

FIG. 2 is a front elevational view of the motor of FIG. 1 when assembled.

FIG. 3 is an isometric view of the rotatable head portion of FIGS. 1 and 2.

FIG. 4 is a cross sectional view along the lines 44 of FIG. 2.

FIG. 5 is a cross sectional view similar to that of FIG. 4 showing a portion of the drawing of FIG. 4 on an enlarged scale.

In the drawings like characters of reference indicate corresponding parts in the different figures.

DETAILED DESCRIPTION

Figure 1:
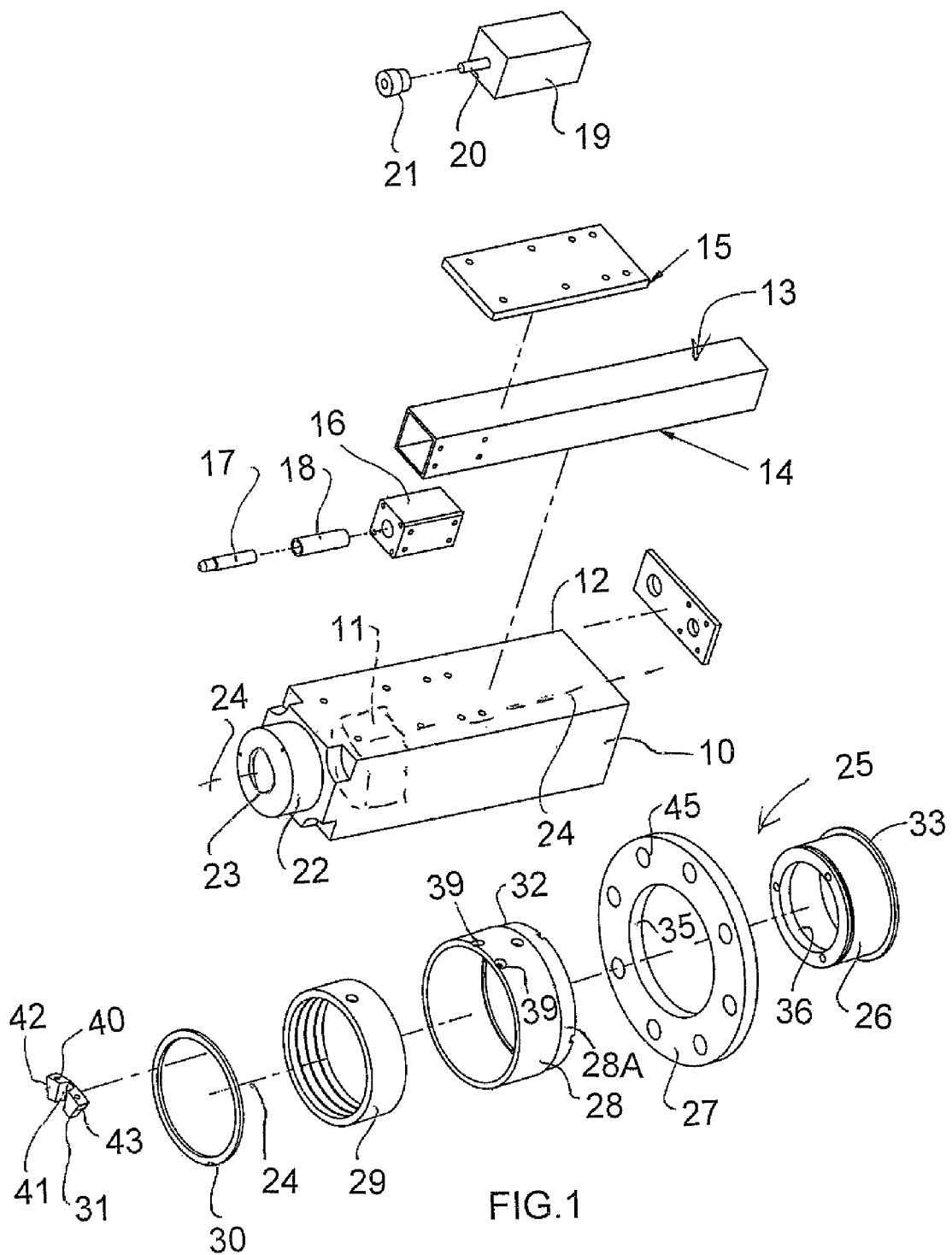
FIG. 1 is an exploded view of the drive motor according to the present invention.

In FIG. 1 is shown a motor indicated at 10 of a conventional construction and of a type which can be purchased from a number of different manufacturers generally designed for driving a grinding tool or a cutting tool. Such motors are commonly known as router motors which drive selective cutting bits which are inserted into a chuck indicated at 11 within the interior of the motor. The drive components of the motor are not shown as these are of course well known and readily available to one skilled in the art. The motor includes a housing 12 which is carried on a suitable support 13 which in the embodiment shown is in the form of a beam 14 which is fastened onto the housing 12 by a mounting plate 15. The beam carries on one side a drive motor 16 for axially moving a pin 17 in a drive sleeve 18. On the opposite side the beam 14 carries a drive motor 19 which includes a rotating output shaft 20 and a sprocket 21.

The motor housing 12 includes an end collar 22 with an opening 23 into which the driven end of a bit can be inserted for engaging into the chuck 11 within the housing of the motor.

Figure 6:
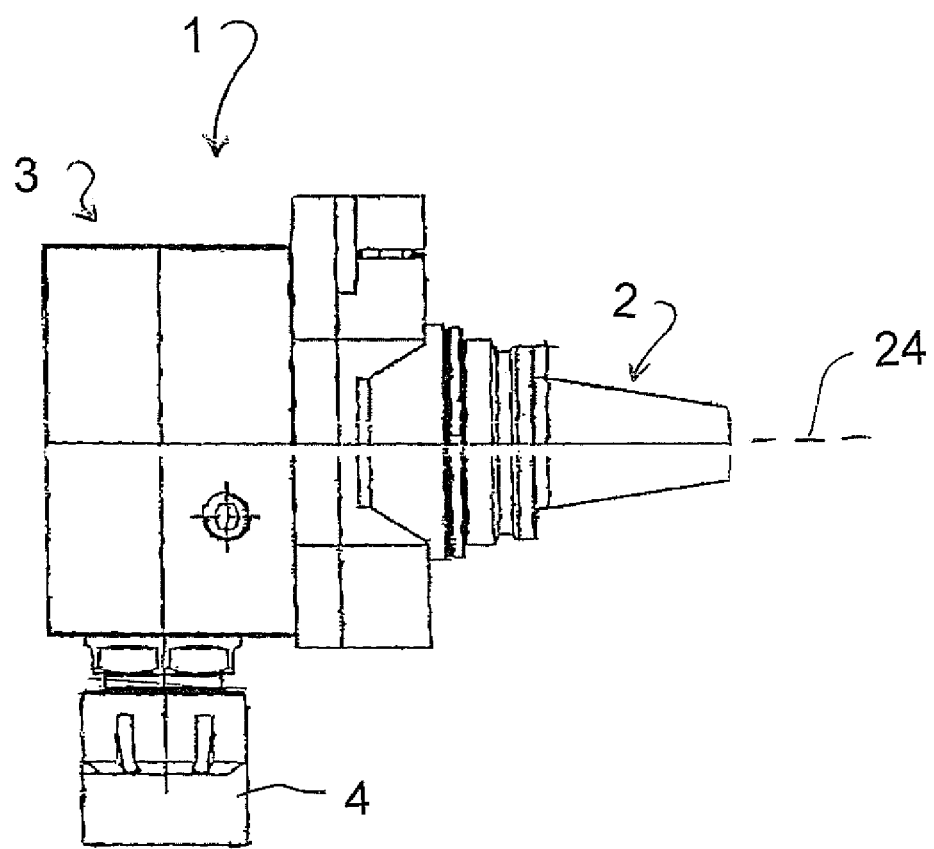
FIG. 6 is a side elevational view of the right angled drive element for use in the drive motor of FIGS. 1 to 5.

The present invention is particularly concerned with driving elements which include one part of the driven element to be fixed relative to the motor and a second part to engage into the chuck so as to be driven about the axis indicated at 24 of the motor. Thus for example a right angle drive 1 as shown in FIG. 6 includes a projecting coupling portion 2 which engages into the chuck and a fixed portion or housing 3 which holds an output drive 4 of the right angle drive at a required angle around an axis 24. This angle can of course be changed by rotating the fixed portion of the angle drive around the axis 24. The construction of the right angle drive and the drive motor to which if couples by the conical coupling 2 is well known to a person skilled in the art and commercially available from a number of manufacturers so that no further detail is required here.

In the embodiment of the present invention this rotation is obtained by providing the assembly generally indicated at 25 which is attached onto the motor and forms a rotatable head for attachment to the driven element. The rotatable head includes a collar 26, a disc 27, a collar 28, a bearing ring 29, a thrust ring 30, a snap ring 30A and an abutment 31.

The collar 26 is mounted onto the collar 22 of the housing in fixed position by suitable screws. The collar 28 is mounted on the collar 26 and can rotate relative to the collar 26 on a bearing ring 29. The disc 27 is fitted onto the outside of the collar 28 in a recess 28A thereof for rotation therewith relative to the collar 22. The disc 27 is held in place between the collar 28 and a rear shoulder 33 of the collar 26. The collar 28 has a shoulder 32 at the end of the recess 28A which butts against the face of the ring and pushes it against a rear shoulder 33 of the collar 26. The shoulder 34 of the collar 26 butts against the end of the collar 22. A central opening 35 in the disc 27 and a central opening 36 in the collar 26 are aligned with the opening 23 allowing the driven portion 2 of the driven element 1 to be inserted into the interior of the collar 22 for engaging the chuck 11.

The abutment 31 is attached to the disc 27 by the abutment 31 being clamped inside the sleeve 28. The abutment 31 is attached by screws passing through holes 39 in the sleeve 28 and engaging into receiving holes 40 in the abutment 31. The abutment 31 forms a slot 41 between two abutment members 42 and 43 for receiving a finger projecting from the angle drive. Thus the finger on the angle drive 1 remains fixed in the slot 41 and holds the angle drive at a required orientation relative to the disc 27.

The disc can however be rotated around the axis 24 of the motor. The disc 27 is rotated by the sprocket 21 which is driven on the shaft 20 by the motor 19. The sprocket engages gear teeth on the outside edge of the disc which are shown in FIG. 4 at 44 but are omitted from the other figures for convenience of illustration. The sprocket engages directly onto the outside edge of the disc 27 and a mounting for the motor 19 places the sprocket in engagement at a suitable location on the outside periphery of the disc.

The disc when rotated to a required position is locked in place by axial movement of the pin 17 which engages into respective ones of a plurality of holes 45 in the disc which are spaced angularly around the axis 24.

Thus in robotic control of the system, the motor 16 is actuated to retract the pin 17 thus freeing the disc 27 for rotation around the axis 24. The motor 19 is a controlled stepping motor which acts to drive the sprocket through a predetermined number of rotations which is controlled to drive the disc through a required angle around the axis 24 until a selected one of the holes 45 reaches its position of alignment with the pin 17. In this position the pin 17 can be returned to its initial locking position by actuation of the motor 16.

In this way a driven element such as an angle gear box can remain in place in the chuck 11 and can be rotated relative to the motor by driving movement of the rotatable head and primarily the disc 27.

This avoids the necessity for the driven element being manually removed from the motor or being robotically removed from the motor for rotation from the motor relative to the driven element and replacement of the driven element on the motor. This drive system therefore can significantly reduce process times in robotic operations particularly related to grinding or machining of parts using a robotically maneuvered motor which carries an angle drive for driving the grinding tool at required angles relative to the workpiece.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A drive motor for driving a driven element, the motor comprising:
   a motor housing having a mounting connection for attachment of the housing to a support;
   a rotor within the housing mounted for driven rotation about a longitudinal axis of the housing;
   a chuck on the rotor for attachment of the rotor to the driven element for driving rotation of the driven element around the axis;
   a rotatable head mounted on the housing and having a detent on the rotatable head for engaging a component of the driven element so as to hold the component of the driven element at a required angle around the axis of the housing and for adjusting the angle;
   and an adjustment motor mounted on the housing for driving adjustment rotation of the rotatable head around the axis so as to effect adjustment of the required angle without removal of the driven element from the chuck.

2. The drive motor according to claim 1 wherein the rotatable head includes a series of angularly spaced receptacles and wherein there is provided a locking pin operable to engage into a selected one of the receptacles to lock the head at the required angle when rotated to the required angle by the adjustment motor.

3. The drive motor according to claim 2 wherein the locking pin is retractable by a pin retraction motor.

4. The drive motor according to claim 1 wherein the rotatable head includes an annular disk member which surrounds the axis of the motor and through which the driven member extends into the chuck.

5. The drive motor according to claim 2 wherein the rotatable head includes an annular disk member which surrounds the axis of the motor and has a central hole through which the driven member extends into the chuck and wherein the receptacles are defined by a series of holes through the disk member at angularly spaced locations around the axis.

6. The drive motor according to claim 4 wherein the adjustment motor includes a sprocket arranged to drive the disk member.

7. The drive motor according to claim 6 wherein the disk member defines a series of gear teeth around its periphery for driving by engagement with the sprocket.

8. The drive motor according to claim 4 wherein the rotatable head includes a collar with the disk clamped onto an outside surface of the collar.

9. The drive motor according to claim 1 wherein the driven member includes an axially extending abutment finger and the rotatable head includes a pair of elements mounted thereon and defining a slot for receiving the finger.

10. The drive motor according to claim 8 wherein the rotatable head includes a sleeve which clamps the disk on to the collar and wherein the driven member includes an axially extending abutment finger and the sleeve includes a pair of elements mounted on an inside surface thereof at a position axially spaced from the disk and defining a slot for receiving the finger.

11. A drive motor for driving a tool, the motor comprising:
   a motor housing having a mounting connection for attachment of the housing to a support;
   a rotor within the housing mounted for driven rotation about a longitudinal motor axis of the housing;
   a chuck on the rotor;
   an angled drive coupling having an input drive connection for mounting in the chuck and an output drive connection arranged at an angle to the axis for driving the tool about a tool drive axis inclined to one side of the motor axis;
   a rotatable head mounted on the housing and having a detent on the rotatable head for engaging a fixed component of the angled drive coupling so as to hold the axis of the angled drive coupling at a required angle around the axis of the housing and for adjusting the angle;
   and an adjustment motor mounted on the housing for driving adjustment rotation of the rotatable head around the axis so as to effect adjustment of the required angle without removal of the angled drive coupling from the chuck.

12. The drive motor according to claim 11 wherein the rotatable head includes a series of angularly spaced receptacles and wherein there is provided a locking pin operable to engage into a selected one of the receptacles to lock the head at the required angle when rotated to the required angle by the adjustment motor.

13. The drive motor according to claim 12 wherein the locking pin is retractable by a pin retraction motor.

14. The drive motor according to claim 11 wherein the rotatable head includes an annular disk member which surrounds the axis of the motor and through which the driven member extends into the chuck.

15. The drive motor according to claim 14 wherein the adjustment motor includes a sprocket arranged to drive the disk member.

16. The drive motor according to claim 15 wherein the disk member defines a series of gear teeth around its periphery for driving by engagement with the sprocket.

17. A drive motor for driving a tool, the motor comprising:
   a motor housing having a mounting connection for attachment of the housing to a support;
   a rotor within the housing mounted for driven rotation about a longitudinal motor axis of the housing;
   a chuck on the rotor;
   an angled drive coupling having an input drive connection for mounting in the chuck and an output drive connection arranged at an angle to the axis for driving the tool about a tool drive axis inclined to one side of the motor axis;
   a rotatable head mounted on the housing and having a detent on the rotatable head for engaging a fixed component of the angled drive coupling so as to hold the axis of the angled drive coupling at a required angle around the axis of the housing and for adjusting the angle;
   wherein the rotatable head includes an annular disk member which surrounds the axis of the motor and has a central hole through which the driven member extends into the chuck;

the disk member having a series of holes through the disk member at angularly spaced locations around the axis;

a locking pin driven by a locking pin motor operable to engage into a selected one of the holes to lock the head at the required angle when rotated to the required angle by the adjustment motor;

and an adjustment motor mounted on the housing and including a sprocket arranged to drive the disk member for driving adjustment rotation of the rotatable head around the axis so as to effect adjustment of the required angle without removal of the angled drive coupling from the chuck.

18. The drive motor according to claim 17 wherein the disk member defines a series of gear teeth around its periphery for driving by engagement with the sprocket.

19. The drive motor according to claim 17 wherein the rotatable head includes a collar with the disk clamped onto an outside surface of the collar.

20. The drive motor according to claim 17 wherein the angled drive coupling includes an axially extending abutment finger and the rotatable head includes a pair of elements mounted thereon and defining a slot for receiving the finger.

21. The drive motor according to claim 17 wherein the rotatable head includes a sleeve which clamps the disk on to the collar and wherein the driven member includes an axially extending abutment finger and the sleeve includes a pair of elements mounted on an inside surface thereof at a position axially spaced from the disk and defining a slot for receiving the finger.

* * * * *